May 15, 1956  W. I. JONES  2,745,160
FASTENER FOR ATTACHMENT TO PLASTIC MATERIAL
Filed April 19, 1948
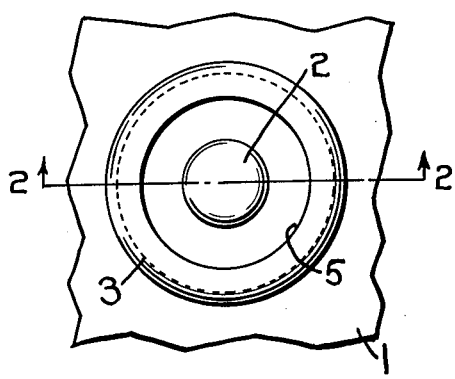
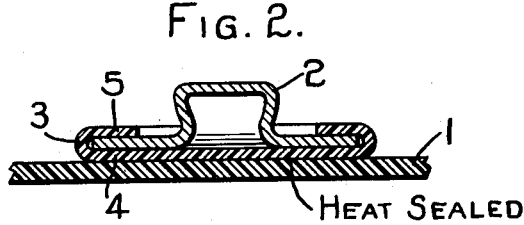
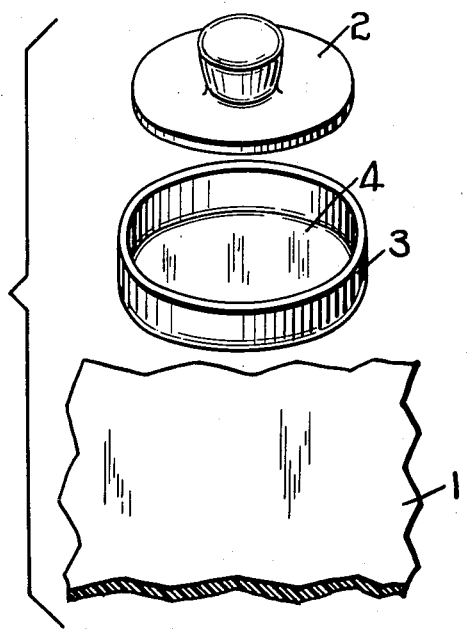
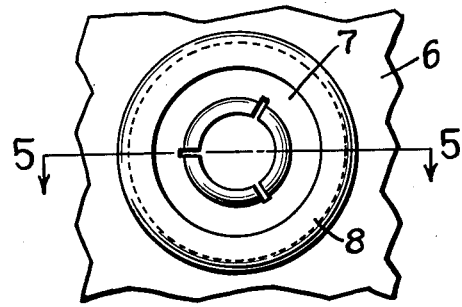
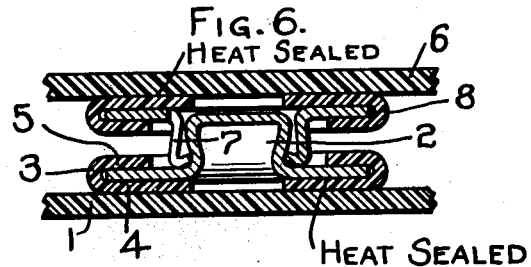
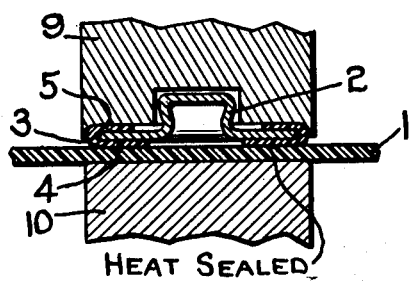
Inventor
WALTER I. JONES
By Philip E. Parker
Attorney

United States Patent Office 2,745,160
Patented May 15, 1956

2,745,160

FASTENER FOR ATTACHMENT TO PLASTIC MATERIAL

Walter I. Jones, Belmont, Mass., assignor, by mesne assignments, to United-Carr Fastener Corporation, Boston, Mass., a corporation of Delaware Application April 19, 1948, Serial No. 21,993

2 Claims. (Cl. 24—217)

My invention aims to provide improvements in articles of manufacture, preferably snap fastener members, that may be used in combination with a plastic material such as the plastic materials that are used today in manufacturing light-weight raincoats, baby pants, and so forth.

Heretofore metal snap fastener members had been applied to this material by means of metal attaching members. That method of attaching snap fastener studs and sockets made it necessary to reinforce the plastic material to prevent the fastener parts tearing loose. My improved invention eliminates the metal attaching parts of the snap fastener members and substitutes attaching means of material that may be welded or heat-sealed, by heat-sealing machines, directly to a plastic material such as the raincoat, baby pants, and so forth, thereby making a strong inexpensive and neat assembly.

Referring to the drawings illustrating my invention:

Fig. 1 is a plan view of a portion of a snap fastener stud installation showing the plastic supporting material, metal snap fastener stud, and the stud attaching material;

Fig. 2 is a section taken on the line 2—2 of Fig. 1;

Fig. 3 is a view of the parts shown in Fig. 1 prior to assembly thereof;

Fig. 4 is a view similar to Fig. 1 but showing the attachment of a snap fastener socket that may be snapped into engagement with the stud shown in Fig. 1;

Fig. 5 is a section taken on the line 5—5 of Fig. 4;

Fig. 6 is a combination of the sections shown in Figs. 2 and 5 showing a complete fastener installation; and Fig. 7 is a section similar to Fig. 2 with the addition of the attaching die members of the welding or heat-sealing equipment to show the manner of heat-sealing the parts in assembly.

Referring now to the drawings which illustrate a preferred embodiment of my invention, I have shown therein a combination of elements whereby snap fastener members are attached to plastic material in a manner involving one embodiment of my invention.

Referring first to Fig. 1, I have shown a piece of plastic material 1 that may represent a portion of an article of manufacture such for instance as a plastic raincoat. Such a garment is frequently formed essentially from a single thickness of self-sustaining plastic sheeting, but for the purposes of the invention the point is that the flexible base sheet to which the fastener is attached presents, at least at its surface where the fastener is to be secured, a continuous film or pellicle of thermoplastic material. To this piece of material 1, I have attached a metallic snap fastener stud member 2 by means of an attaching element 3 which in this instance is a cup-shaped member holding the stud member 2 in position and directly attached to the plastic material 1.

While the stud member 2 may be held in an assembled relation with the plastic material 1 by an attaching member 3 in many different ways, I prefer that the attaching member 3 may be a cup-shaped part formed of plastic material that may be of a type that can be welded or heat-sealed to the plastic supporting material 1. This cup-shaped attaching member 3 is shown in Fig. 3 before the stud is assembled therewith and indicates that it may receive the stud member 2 into the cup where it rests on the bottom portion 4 and is held in final assembly therewith by inwardly crimped rim portion 5 as best shown in Fig. 2.

The types of plastic material that can be welded or heat sealed either by the application of a smooth heated metal surface or by high frequency electronic techniques are well known in the art, and include such materials as polyvinyl chloride, vinyl chloride-acetate compounds, polyvinylidene chloride, vinyl chloride-vinylidene chloride copolymers, polyvinyl alcohol, polyethylene, and rubber hydro-chloride. Such welding or heat sealing should not be confused with vulcanizing processes such as have been used in connection with rubber and which involve changes in the physical characteristics upon the application of heat and pressure in conjunction with the possible addition of an element such as sulphur.

In Figs. 4 and 5 I have shown a snap fastener socket assembly which includes another portion 6 of plastic supporting material forming a part of the article of manufacture. The socket 7 is assembled with a cup-shaped attaching member 8 in the same manner as the stud 2 and attaching member 3.

In Fig. 7 I have illustrated one manner in which a stud or socket assembly may be attached to the plastic article of manufacture. This is accomplished by using any standard heat-sealing equipment having an upper die member 9 and a lower die member 10. The parts of the installation are held in any suitable manner between these die members 9 and 10, one or both of which may have relative movement so that the parts may be clamped tightly while the heat-sealing between the bottom 4 of the cup 3 is being welded to the plastic material 1. This heat-sealing effect may be made electronically or in any other suitable manner.

In describing two-part snap fasteners it is usual to term the male member a stud and the female member a socket. In either case they include an axially extended element which may be circumferentially continuous like the part 2 in the example illustrated or split as in the case of the socket 7 which element at axially different points is of differing transverse dimensions to define an intermediate shoulder outwardly overhanging in the case of the stud and inwardly overhanging in the case of the socket as seen in Figs. 2 and 5 respectively for snapping engagement with cooperating elements of a companion member. Such an element whether male or female may be termed a post.

It will be readily understood by those skilled in the art of heat-sealing that the attachment of the metal parts to plastic garments and the like may be effected in any one of several known methods and that the attaching elements for holding the metal fastener parts to the plastic articles of manufacture may take forms other than the cup-shaped members illustrated and described. As a result of my invention, it will be clear that metallic snap fastener elements may be used on articles of material so that the fastener members are concealed and no attaching members are exposed as is the case when metallic attaching elements are used. This also eliminates the necessity for the use of decorative attaching elements and also reduces the weight to eliminate sagging that is present when all metallic attaching elements are used.

While I have illustrated and described a preferred embodiment of my invention, I do not wish to be limited to particular disclosures in the drawings, my invention being best defined by the following claims.

I claim:

1. An assembly comprising a flexible base sheet at least the outer surface of which is a continuous pellicle of thermoplastic material and, associated therewith, a fastener element comprising a post extending away from the surface and having at axially different points portions of different transverse dimensions defining an intermediate shoulder for cooperation by snapping engagement with complementary portions of a companion member, the post having an integral radially extending flange and a thickness of thermoplastic material of substantially identical peripheral form and size covering its bottom surface and having integral portions overlying its upper surface to unite it mechanically thereto, said thickness being fusedly connected to the surface of said pellicle by an autogenous joint throughout the peripherally extending area of the base to the outer boundary thereof.

2. An assembly as set forth in claim 1 wherein a ring of thermoplastic material of U-shaped cross section is fitted to the periphery and the upper and lower surfaces of the flange and provides the thickness of thermoplastic material which is joined to the pellicle.

References Cited in the file of this patent

UNITED STATES PATENTS

| | | |
|---|---|---|
| 742,089 | Washburne | Oct. 20, 1903 |
| 1,784,389 | Reiter | Dec. 9, 1930 |
| 2,091,617 | Sundback | Aug. 31, 1937 |
| 2,214,030 | Pereles | Sept. 10, 1940 |
| 2,230,879 | Bronson | Feb. 4, 1941 |
| 2,256,850 | Purinton | Sept. 23, 1941 |
| 2,269,419 | Adler et al. | Jan. 13, 1942 |
| 2,294,796 | Moulder | Sept. 1, 1942 |
| 2,307,429 | Steidinger | Jan. 5, 1943 |
| 2,397,801 | Mitchell | Apr. 2, 1946 |
| 2,470,963 | Weyl | May 24, 1949 |

FOREIGN PATENTS

| | | |
|---|---|---|
| 555,645 | Great Britain | Sept. 1, 1943 |